March 28, 1939. H. WOLF 2,152,427
STABILIZING DEVICE
Filed Sept. 13, 1937
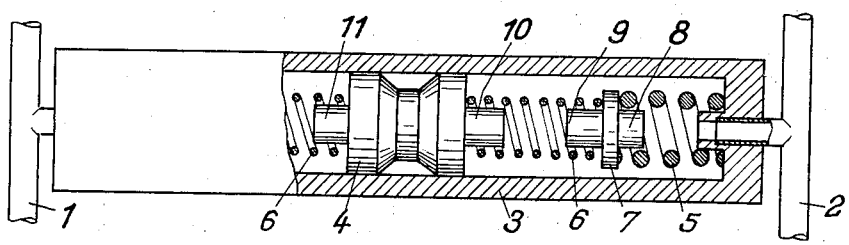
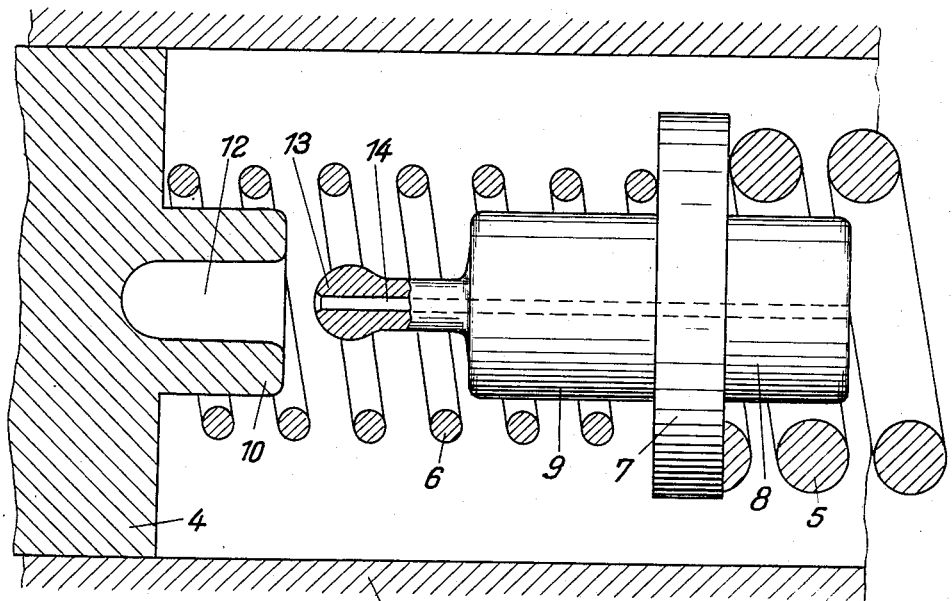
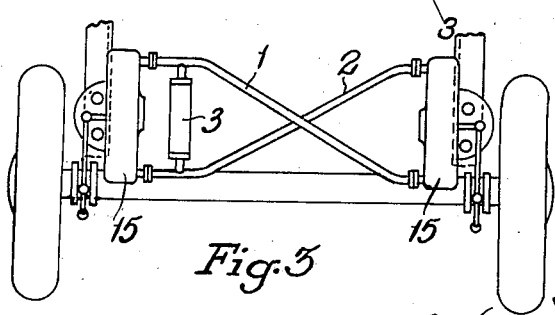
Inventor:
Hermann Wolf Patented Mar. 28, 1939

2,152,427

UNITED STATES PATENT OFFICE 2,152,427

STABILIZING DEVICE

Hermann Wolf, Koblenz-on-the-Rhine, Germany

Application September 13, 1937, Serial No. 163,673
In Germany September 25, 1936

6 Claims. (Cl. 267—11)

The present invention relates to a stabilizer in particular for motor vehicles, according to my application Serial No. 77,865 (4.5.1936) and in particular to the equalizer or auxiliary device described and claimed in that application. In the earlier device the equalizer comprises a cylinder in which a piston supported on both sides by strong springs can move backward and forward under the influence of the liquid pressure emanating from the damping devices of the two sides of the vehicle. With this device which has only one spring on each side of the piston, this spring must be chosen so strong that it can take up the maximum impacts arising normally and is thus frequently too strong for the small impacts which it is to absorb without influencing the other side of the vehicle.

According to the present invention therefore there are provided in the equalizing cylinder connected between the communicating pipes of the damping devices of the two sides of the vehicle, at least two springs of different strength on each side of the piston.

It is thus possible by a suitable choice of the strengths of the separate springs to determine exactly the amounts of the forces to be taken up and equalized by the device, and also the point of time after which there takes place only partially an absorption, accompanied by an influencing of the damping device of the other side of the vehicle.

In order to prevent the turns of the springs, and in particular those of the weaker springs, from closing together completely and thus on the one hand producing a continuous knocking noise, whilst on the other hand there is the danger of the turns of the springs sliding over each other which would lead to trouble with the whole device, according to the invention special devices are provided which can be designed in various ways. For example, there may be provided on the piston and on the spring plates, supplementary pieces which on the compression of the springs bear on each other before the turns of the spring come into contact, or supplementary liquid buffers may be provided which greatly brake the velocity of the compression of the springs during the last portion of the travel of the springs.

The invention is illustrated by the example shown in the annexed drawing in which:

Figure 1 shows the equalizer, partially in section;

Figure 2 shows the design of a liquid buffer on a larger scale; and

Figure 3 is a diagrammatic plan view showing a pair of hydraulic damping devices which are connected through the equalizing device of Figure 1.

Between the communicating pipes 1 and 2 of the damping devices 15 (Figure 3) of the two sides of the vehicle is inserted the equalizer 3, the piston 4 of which is supported on each of the two sides by a strong spring 5 and a weaker spring 6. Between the springs 5 and 6 is the spring plate 7 which is provided with stops 8 and 9. There are also provided on the piston 4 stops 10 and 11. The stop 10 has in the construction according to Figure 2 a recess 12 into which a spherical head 13 fitted on the stop 9 can slide. Through the spherical head 13 and the parts 9, 7, 8 located behind it is a small hole 14, and the device 12, 13, 14 thus acts as a liquid buffer.

In general and primarily with lighter and slower running vehicles it is sufficient (see the embodiment according to Figure 1) to make the opposed surfaces of the respective stops quite level, and the liquid enclosed between these surfaces effects a sufficient damping of the impact.

Having now particularly described and ascertained the nature of my said invention, and in what manner the same is to be performed, I declare that what I claim is:—

1. In a vehicle stabilizing device of the character comprising a pair of hydraulic damping devices connected through an equalizing device, an equalizing device comprising a cylinder, a piston slidable within said cylinder, and a plurality of springs of different strengths interposed between each side of said piston and the adjacent end of said cylinder.

2. In an equalizing device according to claim 1, stop means for preventing sufficient relative movement of said piston and cylinder to cause complete compression of said springs.

3. In a vehicle stabilizing device of the character comprising a pair of hydraulic damping devices connected through an equalizing device, an equalizing device comprising a cylinder, a piston slidable within said cylinder, a plurality of springs of different strengths interposed between each side of said piston and the adjacent end of said cylinder, and spring plates interposed between adjacent ends of said springs on either end of said piston, said piston having projections formed on its respective sides and extending throughout a part of the length of the adjacent springs.

4. An equalizing device according to claim 3, each said spring plate having a surface adapted to engage the adjacent projection formed on said piston upon a predetermined relative movement of said piston and said plate, said movement being insufficient to cause complete compression of the spring lying between said piston and said plate.

5. In an equalizing device according to claim 3, means associated with said piston and said respective spring plates constituting liquid buffers operative to damp relative movements of said piston and spring plates.

6. An equalizer according to claim 1, the stronger of said springs on either side of said piston being of sufficient strength to resist complete compression by the maximum force encountered in normal service.

HERMANN WOLF.